Patented Feb. 19, 1946

2,395,069

UNITED STATES PATENT OFFICE 2,395,069

PREPARATIONS OF ARSENIC AND ANTIMONY

Simon L. Ruskin, New York, N. Y.

No Drawing. Application October 20, 1941,
Serial No. 415,772

10 Claims. (Cl. 260—344.5)

The present invention relates to therapeutic preparations for the administration of arsenic and antimony into the human organism.

The present application is a continuation-in-part of my copending applications, Ser. No. 745,527, filed September 26, 1934, Patent 2,260,870 and Ser. No. 210,772, filed May 28, 1938, Patent 2,259,492.

A number of organic compounds of arsenic and antimony are now in use for the treatment of various diseases, such as syphilis and trypanosomiasis, but their application is frequently attended by irritation and even poisoning, and sometimes gives rise to dermatitis, gingivitis and other affections. While these detrimental side effects are generally due to the susceptibility of the patient to arsenic and antimony poisoning, they are frequently due, at least in part, and sometimes perhaps even entirely, to the other constituents of the medicinal compound. It is my belief that the untoward effects, or a great part of them, obtained with the use of known compounds of arsenic and antimony can to a great extent be traced to the fact that the remainder of the molecule is just as foreign to the human organism, and particularly to the blood stream, as the metal it is sought to introduce, and just as poisonous or difficultly tolerable, so that the system receives a double shock from both the therapeutic metal and the organic radical to which it is joined.

It is accordingly the general object of the invention to provide new preparations of arsenic and antimony having spirochaeticidal and trypanosomicidal activity and characterized by being considerably less toxic than the known preparations containing these metals and currently used in the treatment of syphilis, trypanosomiasis and kindred diseases.

It is a further object of the invention to provide therapeutic preparations of arsenic and antimony which can be tolerated more readily by the human organism and possess the unique property of inhibiting any tendency to dermatitis and gingivitis commonly observed during arsenic and antimony therapy. Other objects and advantages of the invention will appear from the more detailed description hereinbelow.

In accordance with the present invention, the arsenic and antimony are administered in the form of the cevitamate or laevoascorbate in dosages common for these metals. I have found that the cevitamic acid radical offers an unusually effective and non-toxic vehicle for the introduction of these otherwise poisonous metals or metalloids into the human organism. The peculiar structure of cevitamic acid, which supplies both oxidation and reduction mechanisms, makes it a remarkable detoxicating agent and the arsenic and antimony cevitamates are less toxic and more easily tolerated by the body than known preparations of these metals. I have found that the cevitamate radical tends to render the arsenic and antimony more active when combined with such metals by reason of its oxidizing and reducing properties, and thus increases the activity of the metal while at the same time reducing its toxic effects.

I have found further that the cevitamic acid compounds of the above-named metals are quite soluble in water and with the aid of a stabilizing agent, and particularly at a pH value of about 7.6, or slightly higher, can be kept indefinitely in solution. Moreover, these salts possess also the physiological action of cevitamic acid, and thus simultaneously act to correct morbid conditions arising from a deficiency of vitamin C.

Clinical tests have shown that the cevitamic compounds of arsenic and antimony are generally much less irritating on injection than the known, similarly used compounds of these metals; and that the use of the cevitamate compounds even over considerable periods of time will not give rise to dermatitis, gingivitis and other diseases which frequently follow the use of known spirachaeticides and trypanosomicides. The cevitamate compounds are soluble in sodium hydroxide solution and are quite stable in the lower alkaline range, which distinguishes them in an important respect from the commonly used arsenic compounds which, as is known, are stable only in the acid range of pH values and are consequently irritating on injection additionally by reason of the acidity. It is my belief that the lower toxicity and greater ease of administration and higher tolerance of my improved arsenic and antimony compounds are due largely to the fact that their non-metallic portion, namely the cevitamate radical, represents a substance which, unlike the non-metallic portions of known therapeutic arsenic and antimony compounds, is not foreign to the human organism. Cevitamic acid (vitamin C) is itself a material which the body readily absorbs and, in fact, requires, and I have found that the cevitamic acid radical provides an effective and non-poisonous agency for combining the metal with the blood serum proteins, whereby the metal is efficiently transmitted to the tissues and thereby rendered effective. By reason further of the presence of the cevitamic acid radical, not only is the normally poisonous action of the metal reduced, but scorbutic conditions, which increase the sensitivity to arsenic and antimony toxication, are alleviated. By reason of the fact that, when combined with the cevitamic acid in the form of a stable salt, the metals, and particularly antimony, form part of the redox mechanism of the body, the phenomenon of drug interference that has been noted in the action of free cevitamic acid on known compounds of antimony in vitro, does not occur. I have in fact found that when combined with cevitamic acid, the bactericidal action of these metals in vivo, is not only not reduced, but is actually increased. The trypanosomicidal action of antimony cevitamate has been established by clinical tests and the compound has proved to be particularly efficacious in the treatment of sleeping sickness and kala azar.

The following examples present by way of illustration satisfactory methods for the preparation of the arsenic and antimony compounds, but the invention is not to be understood as being restricted thereto.

*Example 1.—Preparation of arsenic compound of ascorbic acid*

23.4 g. ($\frac{1}{10}$ mole) acetone ascorbate are dissolved in 10 parts of dry ether and heated with 6.9 g. (3 parts) finely divided sodium. The mixture was refluxed until reaction was complete. After cooling the excess sodium was removed by filtration. The ether solution of the sodium salt of monoacetone ascorbic acid was then cooled to the temperature of ice water and treated with 126 g. (4 parts) of arsenic bromide dissolved in the least amount of dry ether. Vigorous reaction took place and the mass solidified. 50 parts of ether were then added and the mixture warmed to room temperature when most of the material dissolved leaving a fine precipitate of sodium bromide which was removed by filtration.

The arsenic bromide derivative was obtained by evaporation of the ether. The bromine was then removed by exposure to air or treatment with a minimal amount of water required for suspension, and filtering.

*Example 2.—Preparation of antimony cevitamate*

1.8 g. cevitamic acid are dissolved in 10 cc. saturated saline (NaCl) solution. To this is added slowly under stirring 4.3 g. $SbCl_3$ dissolved in 20 cc. saturated saline solution. The acid solution is cooled with ice, and under stirring and cooling 12 cc. 5N NaOH saturated with salt are added. This leaves the solution still acid. The precipitate is centrifuged, and is then washed three times by centrifugation with distilled water. The moist precipitate weighing 4.8 g. when dry (theory 4.9 g.) is now suspended in 100 cc. of 50% glycerol solution and 5N alkali solution is dropped in under violent stirring until a faint permanent cloudiness remains. The solution is filtered through a filter cell until clear. It should have a pH around 9.6. There are then added 2.5 cc. $Na_2SO_3$ (containing 250 mg.) to stabilize the solution. If a lower pH is desired, a little excess cevitamic acid can be added. The solution is then made up to 150 cc. and bottled immediately. This solution should contain approximately 15 mg. Sb per cc.

The solutions of the cevitamates above described may be packaged in ampules or if desired in the solid condition in the form of tablets. The compounds may be prepared in an indifferent atmosphere, like $N_2$ or $CO_2$, but this is not absolutely necessary; while if desired the ampules may be charged in such an atmosphere or may have $CO_2$ dissolved in the solution.

Where, as in Example 2, a relatively high alkalinity is produced, the various organic acids can be employed to adjust the pH to a lower alkalinity, care being however taken to avoid precipitation. Tartaric, citric, gluconic and other injectible organic acids may be used for this purpose. To bring the pH down from above 9 to 8, tartaric or citric acid is satisfactory, whereas gluconic acid may cause precipitation.

Local anaesthetics such as chlorbutanol or benzyl alcohol may be added to reduce tissue sensitivity. They likewise have a desirable effect on the stability of the solution.

The arsenic and antimony cevitamates are administered parenterally, preferably intramuscularly. The dosage may amount to 20 to 40 mg. of the metal once or twice weekly. They are both suitable for the treatment of syphilis and protozoan diseases, like trypanosomiasis.

In place of NaOH, other bases may be employed, such as KOH, $Na_2CO_3$, etc., while in place of cevitamic acid and a base, a salt of cevitamic acid may be used. The inorganic salts of antimony and arsenic above named may be replaced by other salts having relatively non-toxic anions and capable of entering into double decomposition with cevitamates; if desired, the hydroxides of the metals may be used, but they generally react with cevitamic acid only with difficulty. The sodium sulfite may be used with or be substituted by the soluble salts of the other weak acids, like the citrates, or by sucrose, organic acids like tartaric and citric acids, or other stabilizers which are suitable for injection. The amounts of the salts used as stabilizers or buffers is not critical and such salts may even be used to render the solutions isotonic. The solutions may, however, be rendered isotonic also by the addition of a suitable quantity of sodium chloride.

Variations from the specific methods of procedure above described will occur to those skilled in the art without departing from the spirit of the invention.

I claim:

1. The cevitamic acid compound of a member of the group consisting of arsenic and antimony.

2. A composition prepared for use as a spirochaeticide and comprising a solution of the reaction product of cevitamic acid, a base and a soluble compound of arsenic.

3. A composition prepared for use as a trypanosomicide and comprising a solution of the reaction product of cevitamic acid, a base and a soluble compound of antimony.

4. A cevitamic acid compound of arsenic.

5. A cevitamic acid compound of antimony.

6. A composition prepared for use as a therapeutic agent and comprising the stabilized reaction product of cevitamic acid, an alkali-metal base, and a soluble compound of a member of the group consisting of arsenic and antimony.

7. A composition prepared for use as a therapeutic agent and containing a compound of cevitamic acid and antimony solubilized with a soluble, non-toxic base.

8. A composition as defined in claim 7, wherein the base is sodium hydroxide.

9. A composition prepared for use as a therapeutic agent and containing a compound of cevitamic acid and antimony solubilized with a soluble, non-toxic base, and containing also a stabilizing agent.

10. A composition prepared for use as a therapeutic agent and containing a cevitamic acid compound of a member of the group consisting of arsenic and antimony in aqueous solution at a pH value in the alkaline range but no higher than 9.

SIMON L. RUSKIN.